(No Model.)

E. V. MITCHELL & M. G. PLIMPTON.
STRAW HAT SEWING MACHINE.

No. 317,836. Patented May 12, 1885.

Witnesses.
Philip Mauro
C. J. Hedrick

Inventors
Edwin V. Mitchell and
Melvin G. Plimpton
by A. Pollok
their attorney.

UNITED STATES PATENT OFFICE.

EDWIN V. MITCHELL AND MELVIN G. PLIMPTON, OF MEDFIELD, MASSACHUSETTS, ASSIGNORS TO THE WILLCOX & GIBBS SEWING MACHINE COMPANY, OF NEW YORK, N. Y.

STRAW-HAT-SEWING MACHINE.

SPECIFICATION forming part of Letters Patent No. 317,836, dated May 12, 1885.

Application filed December 19, 1884. (No model.)

*To all whom it may concern:*

Be it known that we, EDWIN V. MITCHELL and MELVIN G. PLIMPTON, of Medfield, Norfolk county, Massachusetts, have invented a new and useful Improvement in Straw-Hat-Sewing Machines, which improvement is fully set forth in the following specification.

This invention has reference to means for enabling the user of a straw-hat-sewing machine to set the plait-guide at a definite distance from the needle, and to replace it accurately in the same position after having removed it for any reason.

It consists in a special construction and arrangement of a pointer or index-finger and a graduated plate and the combination of the same with the plait-guide.

Figure 1:
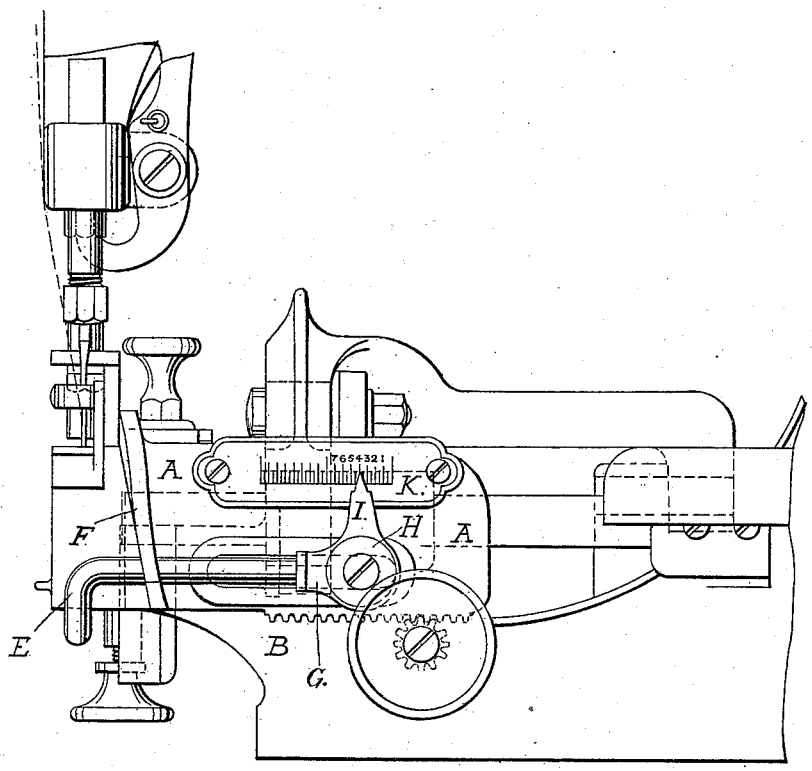
Figure 2:
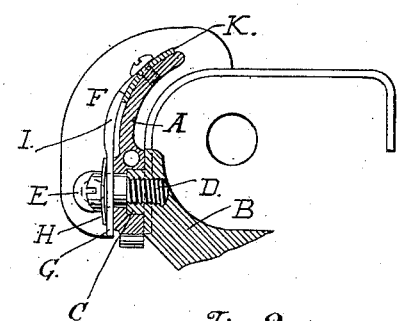

In the accompanying drawings, Figure 1 is a partial view in front elevation of a straw-hat-sewing machine provided with the improvement; and Fig. 2 a detail view, partly in section and partly in elevation.

The machine shown is itself of well-known construction. It is described in United States Patents No. 218,413, dated August 12, 1879, and No. 246,700, dated September 6, 1881, both granted for inventions of Charles H. Willcox.

The plait-guide A is attached to the base B of the machine-frame by means of the tongue C on the machine-frame fitting within a groove in the body of the guide A, and the screw D passing through a slot in the guide. The guide-pin E, which passes through a hole in the flange F of the plait-guide, is at the the inner end (right hand of Fig. 1) provided with a plate, G. The screw D passes through a hole in this plate and retains the guide-pin in place. A spring-washer, H, is placed under the head of the screw between it and the plate G.

So far the construction is the same as in the later of the above-mentioned patents.

In the present improvement the plate G is provided with a pointer or index-finger, I, (which it did not have heretofore,) and there is a graduated plate, K, fastened on the plait-guide and arranged thereon, so that when the plait-guide is adjusted the graduations pass successively the end of the pointer. The pointer is made in one piece with the plate G, or is otherwise attached thereto. The pointer and graduations are of great assistance in doing uniform work.

The attachment of the pointer to the plate G at the inner end of the guide-pin is the best form of the invention, and is specially claimed, but the invention is not wholly limited thereto, since there are other and broader features of novelty. For example, while it is not new to use a pointer opposite a graduated surface in connection with sewing-machine guides it is believed to be new to adapt and apply the same to the plait-guide of a straw-hat-sewing machine.

It will be observed that in the machine shown the pointer is retained in place by the same screw which holds the sliding plait-guide and the guide-pin in position, and also that the pointer is permanently attached (through the plate G, which may be regarded as part either of the pointer or of the guide-pin) to the guide-pin E. Of course the graduations could be directly on the guide instead of on an attached plate.

We claim—

1. The combination, with the flanged plait-guide supported on the face of the machine-frame and connected therewith by a tongue and groove, the guide-pin passing through a hole in the flange of said plait-guide, and the screw for retaining the plait-guide and guide-pin in place, of the graduated plate on the upper part of the plait-guide to the right of said flange and above said screw, and the stationary pointer opposite the graduations, substantially as described.

2. In combination with the sliding plait-guide provided with a graduated plate, the stationary guide-pin having a pointer permanently attached thereto, substantially as described.

3. The pointer attached to the perforated plate at the inner end of the guide-pin, in combination with said guide-pin, the plait-guide provided with a graduated plate and the holding-screw, substantially as described.

In testimony whereof we have signed this specification in the presence of two subscribing witnesses.

EDWIN V. MITCHELL.
MELVIN G. PLIMPTON.

Witnesses:
J. B. HALE,
I. B. CODDING.